United States Patent
Hahn et al.

(10) Patent No.: US 9,145,674 B2
(45) Date of Patent: Sep. 29, 2015

(54) VACUUM INSULATION PANELS COMPRISING NANOPOROUS POLYMER PARTICLES

(75) Inventors: Klaus Hahn, Kirchheim (DE); Elena Khazova, Mannheim (DE); Jan Kurt Walter Sandler, Heidelberg (DE); Marc Fricke, Osnabrück (DE); Maria-Kristin Sommer, Wachenheim (DE); Roland Hingmann, Ladenburg (DE)

(73) Assignee: BASF SE, Ludwigshafen (DE)

( * ) Notice: Subject to any disclaimer, the term of this patent is extended or adjusted under 35 U.S.C. 154(b) by 269 days.

(21) Appl. No.: 13/594,249

(22) Filed: Aug. 24, 2012

(65) Prior Publication Data

US 2013/0052393 A1 Feb. 28, 2013

Related U.S. Application Data

(60) Provisional application No. 61/527,641, filed on Aug. 26, 2011.

(51) Int. Cl.
*E04B 1/80* (2006.01)

(52) U.S. Cl.
CPC .............. *E04B 1/803* (2013.01); *Y02B 80/12* (2013.01); *Y10T 428/231* (2015.01)

(58) Field of Classification Search
CPC ............................ F16L 59/065; E04B 1/803
USPC ........................................................ 428/69
See application file for complete search history.

(56) References Cited

U.S. PATENT DOCUMENTS

| | | |
|---|---|---|
| 5,480,696 A | 1/1996 | Harris et al. |
| 2007/0259979 A1 | 11/2007 | Lee |
| 2009/0148665 A1 | 6/2009 | Thiagarajan et al. |
| 2010/0148109 A1 | 6/2010 | Schadler et al. |
| 2011/0287066 A1 | 11/2011 | Sandler et al. |
| 2011/0287260 A1 | 11/2011 | Sandler et al. |
| 2012/0164431 A1 | 6/2012 | Sandler et al. |

FOREIGN PATENT DOCUMENTS

| | | |
|---|---|---|
| DE | 102008023870 A1 | 11/2009 |
| WO | WO-2008/138978 A1 | 11/2008 |
| WO | WO-2011144728 A1 | 11/2011 |
| WO | WO-2013/030020 A1 | 3/2013 |

OTHER PUBLICATIONS

International Search Report for PCT/EP2012/066162 dated Aug. 20, 2012.
International Report on Patentability for PCT/EP2012/066162 dated Aug. 20, 2012.

*Primary Examiner* — Alexander Thomas
(74) *Attorney, Agent, or Firm* — Drinker Biddle & Reath LLP

(57) ABSTRACT

The invention relates to a vacuum insulation panel comprising a barrier film and a core material having a density in the range from 50 to 350 kg/m$^3$, wherein the core material comprises a mixture of A) from 30 to 100 percent by weight of nanoporous polymer particles which have a cell count in the range from 1000 to 100 000 cells/mm, where at least 60 percent by weight of the nanoporous polymer particles have a particle size of less than 100 μm in the sieve analysis in accordance with DIN 66165, and
B) from 0 to 70 percent by weight of pyrogenic or precipitated silica, and also a process for the production thereof.

9 Claims, No Drawings

VACUUM INSULATION PANELS COMPRISING NANOPOROUS POLYMER PARTICLES

CROSS-REFERENCE TO RELATED APPLICATIONS

This application claims benefit (under 35 USC 119(e)) of U.S. Provisional Application 61/527,641, filed Aug. 26, 2011, which is incorporated by reference.

The present invention relates to a vacuum insulation panel comprising nanoporous polymer particles as core material.

Vacuum insulation panels (VIPs) are known as highly efficient insulation materials. Depending on the core material and the reduced pressure, they have a thermal conductivity of from about 4 to 8 mW/mK and thus a from 8- to 15-times better thermal insulation action than conventional thermal insulation systems.

However, the good thermal insulation properties are lost when these vacuum insulation panels are ventilated by damage. The insulating action then corresponds only to that of the core materials used. The life is limited by the diffusion of surrounding gases through the barrier film or envelope into the vacuum panels. A further disadvantage of present-day vacuum insulation panels is the lack of low thermal conductivity at moderate pressures and at low densities of about 150 g/L.

Such insulation elements are used, for example, in refrigeration appliances and freezers. However, use as insulation for buildings has also already been proposed. DE 10 2008 023 870 A1 discloses a vacuum insulation element for the insulation of buildings, which is of the type described at the outset and in which the two main surfaces of the envelope are formed by glass, in particular glass plates. Such vacuum insulation elements having a glass envelope do not display sufficiently efficient thermal insulation for many applications because of the higher thermal conductivity of the glass compared to plastic.

Accordingly, there is a need to find material which have favorable thermal insulation properties at a pressure above the vacuum range and in particular at atmospheric pressure and at the same time have low densities.

As core materials for vacuum insulation panels, it is possible to use open-celled microcellular or nanocellular materials, with nanocellular core materials displaying a significantly lower change in the thermal conductivity when the pressure increases, for example as a result of permeation of water vapor and oxygen into the envelope in the event of damage. This increases the effective life and gives a lower sensitivity compared to film materials.

As nanocellular core materials, use is at present made predominantly of nanoporous silicas as described, for example, in U.S. Pat. No. 5,480,696. A disadvantage of these materials is their hydrophilicity. For use as core materials, the pulverulent silicas therefore have to be either hydrophobicized or dried in a complicated manner.

Nanocellular polymer materials based on polyurethane, polyurea or melamine resins are likewise suitable (WO2008/138978). Although their hydrophilicity is less pronounced, particularly in the case of the melamine resins, drying is nevertheless necessary. In addition, the synthesis via a sol-gel process is complicated and costly.

US 2009/0148665 describes the properties of nanocellular polymer foams having an average pore size of from 10 to 500 nm and a density in the range from 240-600 kg/m³ to be expected from simulation calculations and their possible use in sandwich panels or structural components for thermal insulation. However, the thermal conductivity of the composites is increased by the additional components.

US 2007/0259979 describes composites made up of an organic aerogel matrix based on polyurethanes and inorganic aerogel fillers, e.g. silica aerogel. The composites are obtained by the sol-gel process from a mixture containing an organic gel precursor and the inorganic aerogel filler and subsequent drying under supercritical conditions.

Vacuum insulation panels comprising nanoporous thermoplastic polymer foams are described in WO 2011/144728.

It is therefore an object of the present invention to discover vacuum insulation panels and in particular core materials for vacuum insulation panels and also processes for producing them, which do not have the abovementioned disadvantages and, in particular, can be produced simply and inexpensively without complicated drying.

We have accordingly found vacuum insulation panels comprising a core material having a density in the range from 50 to 350 kg/m³, wherein the core material comprises a mixture of A) from 30 to 100 percent by weight of nanoporous polymer particles which have a cell count in the range from 1000 to 100 000 cells/mm, where at least 60 percent by weight of the nanoporous polymer particles have a particle size of less than 100 µm in the sieve analysis in accordance with DIN 66165, and B) from 0 to 70 percent by weight of pyrogenic or precipitated silica.

Core Material

The core material comprises the components in the proportions by weight indicated. It preferably consists of the components A) and B).

The core material preferably consists of a mixture of

A) from 25 to 95 percent by weight, preferably from 30 to 70 percent by weight, of the nanoporous polymer foam particles and B) from 5 to 75 percent by weight, preferably from 30 to 70 percent by weight, of pyrogenic or precipitated silica.

The density of the core material of the vacuum insulation panels is in the range from 50 to 350 kg/m³, preferably in the range from 70 to 300 kg/m³, particularly preferably in the range from 80 to 250 kg/m³.

The core material preferably has a water content in the range from 0.1 to 1% by weight, particularly preferably in the range from 0.1 to 0.5% by weight.

Component A)

According to the invention, at least 60 percent by weight, preferably at least 95 percent by weight, particularly preferably at least 99 percent by weight, of the nanoporous polymer particles have a particle size of less than 100 µm in the sieve analysis in accordance with DIN 66165.

Preference is given to vacuum insulation panels in which at least 50 percent by weight, preferably at least 95 percent by weight, particularly preferably at least 99 percent by weight, of the nanoporous polymer particles (component A) have a particle size of less than 63 µm in the sieve analysis in accordance with DIN 66165.

Particular preference is given to using nanoporous polymer particles in which at least 60 percent by weight of the nanoporous polymer particles (component A) have a particle size of less than 100 µm in in the sieve analysis in accordance with DIN 66165 and at the same time at least 50 percent by weight of nanoporous polymer particles have a particle size of less than 63 µm in the sieve analysis in accordance with DIN 66165.

As nanoporous polymer particles, it is possible to use particles comprising polystyrene, polymethyl methacrylate (PMMA), polycarbonate, styrene-acrylonitrile copolymers, polysulfones, polyether sulfone, polyetherimide, polyurethane, melamine-, phenol-, resorcinol-, urea-formaldehyde resins or mixtures thereof. Preference is given to using nanoporous polymer particles composed of polystyrene, styrene-acrylonitrile copolymers or polymethyl methacrylate (PMMA).

The nanoporous polymer particles have an average cell count in the range from 1000 to 100 000 cells/mm, preferably from 2000 to 50 000 and particularly preferably from 5000 to 50 000 cells/mm. The foam density is usually in the range from 50 to 350 kg/m³, preferably in the range from 50 to 300 kg/m³, particularly preferably in the range from 10 to 250 kg/m³.

According to the invention, the term "nanoporous" comprises pore sizes in the range from 5 to 1000 nanometers.

According to the invention, the term "average cell count" refers to the number of cells per mm. It can be determined from the average diameter of circular foam cells having cross-sectional areas equivalent to the real cells in typical frequency/size curves, as can be determined by evaluation of at least 10 real cell areas on representative electron micromicrographs.

According to the invention, the term "foam density" or "density" refers to the mass to volume ratio of the foamed nanoporous molding composition, which can be determined by the buoyancy method or is calculated from the ratio of mass to volume of a molding.

According to the invention, the term "molding composition" or "polymer melt" comprises both pure homopolymers and copolymers and also mixtures of polymers. Furthermore, the term also encompasses formulations based on polymers and on various additives. Mention may be made here by way of example of process additives such as stabilizers, fluidizers, color additives, anti-oxidants and similar additives known to those skilled in the art.

The foams can be closed-celled but are preferably open-celled.

"Closed-celled" means that a discontinuous gas phase and a continuous polymer phase are present.

"Open-celled" means that a bi-continuous system is involved, in which the gas phase and the polymer phase are each continuous phases and the two phases interpenetrate.

The nanoporous polymer particles have a proportion of open cells (in accordance with DIN ISO 4590) of more than 40%, preferably more than 50%, particularly preferably more than 75%. In the ideal case, at least 90%, if not all, of the cells are open, i.e. the foam framework consists only of struts.

The nanoporous polymer particles used according to the invention can, for example, be produced as described below.

A preferred process for producing the nanoporous polymer foam particles comprises the steps a) loading of a polymer melt made up of thermoplastic polymers with a blowing agent under pressure and at a temperature at which the blowing agent is present in the supercritical state,
b) bringing of the loaded polymer melt to a temperature which is in the range from −40 to +40° C. around the glass transition temperature of the pure polymer,
c) depressurization of the polymer melt loaded in step a) at a depressurization rate in the range from 15 000 to 2 000 000 MPa/sec and
d) comminution of the nanoporous polymer foam obtained in step c) to give foam particles having an average particle diameter in the range from 50 to 500 μm.

The temperature of the loaded polymer melt is preferably controlled in step a) in such a way that the temperature at the moment of foaming is in the range from −20 to +35° C. around the glass transition temperature of the unloaded polymer melt. Particular preference is given to a temperature range which differs by from 0 to +30° C. from the glass transition temperature of the pure polymer.

The glass transition temperature is the measurable glass transition temperature. The glass transition temperature can be measured by means of DSC in accordance with DIN ISO 11357-2 at a heating rate of 20 K/min.

In the first step (step a), a polymeric molding composition (polymer melt) is loaded with a gas or a fluid as blowing agent under a pressure and at a temperature at which the blowing agent is in the supercritical state.

As thermoplastic polymers for the polymer melt, it is possible to use, for example, styrene polymers, polyamides (PA), polyolefins such as polypropylene (PP), polyethylene (PE) or polyethylene-propylene copolymers, polyacrylates such as polymethyl methacrylate (PMMA), polycarbonate (PC), polyesters such as polyethylene terephthalate (PET) or polybutylene terephthalate (PBT), polysulfones, polyether sulfones (PES), polyether ketones, polyetherimides or polyether sulfides (PES), polyphenylene ethers (PPE) or mixtures thereof. Particular preference is given to using styrene polymers such as polystyrene or styrene-acrylonitrile copolymers or polyacrylates such as polymethyl methacrylate.

Particularly suitable polymers are thermoplastically processable amorphous polymers which have a proportion of crystalline material of not more than 3% (determined by DSC).

Suitable blowing agents are solid, gaseous or liquid blowing agents such as carbon dioxide, nitrogen, air, noble gases such as helium or argon, aliphatic hydrocarbons such as propane, butane, partially halogenated or perhalogenated aliphatic hydrocarbons such as fluorinated hydrocarbons, chlorofluorocarbons, difluoroethane, aliphatic alcohols or dinitrogen oxide (nitrous oxide), with carbon dioxide, nitrous oxide and/or nitrogen being preferred. Very particular preference is given to carbon dioxide.

The blowing agent can be introduced and/or injected directly in the supercritical state, or the process parameters of the polymer to be injected can at the point of time of injection be in such a range that the blowing agent becomes supercritical under these conditions. In the case of $CO_2$, for example, the critical point is about 31.1° C. and 7.375 MPa; in the case of N20, for example, the critical point is about 36.4° C. and 7.245 MPa.

The loading of the polymeric molding composition or melt with blowing agent can, according to the invention, be carried out in a pressure chamber, e.g. an autoclave, or in a mold cavity or in an extruder. According to the invention, the precise temperature of the polymeric molding composition is unimportant in this step, but a temperature above the critical temperature of the blowing agent and above the glass transition temperature of the polymeric molding composition is advantageous for this first loading step since the uptake of the blowing agent by diffusion processes is accelerated at temperatures above the glass transition temperature of the polymeric molding composition and shorter loading times are thus possible.

For the loading step, a pressure above the critical pressure of the blowing agent, preferably above 10 MPa, particularly preferably above 20 MPa, is set. This loading pressure is important in order to generate a very high gas concentration in the polymeric molding composition and can, within the engineering possibilities of present-day pressure vessels, be set to a value up to 200 MPa.

In one variant, loading can be carried out in an extruder. In an advantageous variant, the temperature of the polymeric molding composition in the region of blowing agent injection is above the glass transition temperature of the molding composition, so that the blowing agent can become distributed and dissolved very well and quickly in the melt. The injection pressure is generally set to a value higher than the melt pressure in this range. In a particularly advantageous embodiment, the injection pressure is set to a constant high value by means of a pressure regulating valve. According to the invention, a blowing agent mass flow which, based on the mass flow of the polymeric molding composition, can be from 1 to 60% by weight, in particular from 5 to 50% by weight, is set here. The upper limit to the blowing agent loading is the saturation concentration which can be achieved at the parameters pressure and temperature of the loaded melt upstream of the die; this can be determined either empirically in the process or by means of gravimetric methods.

In a second step (step b) of the process, the loaded polymeric molding composition is then cooled, while maintaining the loading pressure of greater than 10 MPa, preferably greater than 20 MPa, to a temperature which is in the range from −40 to +40° C., preferably from −20 to +35° C., particularly preferably from 0 to 30° C., around the glass transition temperature of the unloaded polymeric molding composition which can be determined by means of DSC in accordance with DIN-ISO 11357-2 at a heating rate of 20 K/min.

In an embodiment of the process in an autoclave, this adaptation of the temperature of the polymeric molding composition can be carried out after application of the loading pressure. As an alternative, this temperature can also be set before application of the loading pressure. In both process variants, a sufficient time for homogenization of the temperature has to be ensured, especially after injection of the cold blowing agent into the cavity. Furthermore, in these process variants, a sufficient time for achieving the saturation concentration by diffusion has to be ensured, especially in the case of relatively large volumes of the polymeric molding composition.

In a further variant in an extruder, the loaded molding composition is cooled continuously. Here, it is possible to use all apparatuses known to those skilled in the art, from a cooling extruder through to mixers and coolers in any number and combination. In order to maintain the pressure of the loaded molding composition, melt pumps can be used for increasing the pressure and these can likewise be installed in any number and position in the process. This also results in an advantage of the embodiment according to the invention, namely that a segmented structure of the process train gives good control over the local parameters pressure and temperature and allows rapid and homogeneous cooling of the loaded molding composition under pressure. However, a proviso is that homogeneous distribution of the blowing agent molecules is achieved by means of a sufficient residence time and mixing and that the blowing agent can be completely dissolved in the polymeric molding composition.

A rapid depressurization of the loaded and temperature-controlled polymeric molding composition in the third step (step c) leads to stable nanoporous polymer foams having a low density.

In a third step (step c), the polymer melt which has been loaded with blowing agent in step a) and brought to the appropriate temperature in step b) is depressurized at a depressurization rate in the range from 15 000 to 2 000 000 MPa/sec. The depressurization rate is based on the pressure change which takes place within a time of one second before foaming. The pressure drop here is at least 10 MPa.

The pressure before depressurization can be determined by means of a pressure sensor. Depressurization is usually carried out to atmospheric pressure. However, a slightly superatmospheric or subatmospheric pressure can also be applied. In general, the decrease in pressure occurs suddenly within 0.1 to 10 ms. The depressurization rate can, for example, be determined by drawing a tangent in the region of the greatest pressure decrease in the pressure-temperature graph.

In the continuous embodiment by means of an extruder, the depressurization rate is usually set via the shape of the die. In general, a die having at least one die section which preferably has a length of from 1 to 5 mm and a cross section of 0.1-25 mm² is used for this purpose.

Setting of a depressurization rate in the range from 15 000 to 2 000 000 MPa/s, preferably in the range from 30 000 to 1 000 000 MPa/s, particularly preferably in the range from 40 000 to 500 000 MPa/s, makes it possible to produce a nanoporous foam morphology combined with a significantly lower foam density from a polymeric molding composition having a very high blowing agent concentration and accordingly a low viscosity even at homogeneous foaming temperatures above the glass transition temperature of the unloaded molding composition. It has been found that in some cases depressurization rates up to 200 000 MPa/s can be sufficient. In these cases, the process can be carried out in a simplified way.

This third step (step c) can be realized in the various process variants in different ways. In one variant in an autoclave, the depressurization rate according to the invention can be ensured either by means of quick-switching valves or by means of controlled actuation of depressurization devices, for example a bursting disk. In one variant of the invention in a tool cavity, the depressurization can be effected by rapidly enlarging the cavity.

In the preferred embodiment in an extruder, the depressurization rate is ensured by the transport power of the extruder and the die geometry.

Furthermore, the present invention relates to other industrially implementable apparatuses and methods with which a person skilled in the art would be familiar for producing such nanoporous polymer foams by means of the above-described rapid depressurization according to the invention of a polymeric molding composition which has been brought to the appropriate temperature according to the invention.

Depending on the die geometry used, it is possible to produce foam structures and ultimately polymer foams of various shapes, especially in the extrusion process. In preferred embodiments of the process of the invention, solid profiles, for example plates, or hollow profiles are produced.

In a likewise preferred embodiment of the process, the polymer foam is comminuted in a further process step (optional step d) to produce shaped bodies in the form of foamed polymer particles, pellets or powders, e.g. by means of a parting disk, a pelletizer, a blade, a chopping knife or a mill. The comminution step can preferably immediately follow the depressurization but can also be carried out separately at a later point in time. Here, it can be advantageous to cool the polymer foam, for example by means of ice water, dry ice or liquid nitrogen.

The comminution in step d) can be carried out in one or more stages, in the latter case in one apparatus or in a plurality of different apparatuses. For example, the nanoporous polymer foam can firstly be subjected to precomminution and subsequently to postcomminution. Postcomminution can advantageously be carried out in a cutter mill or a fluidized-bed opposed-jet mill. The foam particles after comminution preferably have an average particle diameter in the range from 10 μm to 10 mm, particularly preferably in the range from 50 μm to 0.5 mm.

Possible apparatuses for comminution are, in particular, screw comminuter, rotorary shears, single-shaft and multi-shaft comminuters, roll mills, fine mills, fine milling units, impact disk mills, hammer mills and fluidized-bed opposed-jet mills.

Processes and apparatuses for the comminution of organic materials are widely known to those skilled in the art. A person skilled in the art will select a suitable apparatus according to the amount to be comminuted, the desired throughput, the particle size to be achieved and the brittleness of the material used.

In later use, the flow of the loose material and the low density of the nanoporous polymer foam in the pressed state are of great advantage. Further advantages of the loose materials are the particle diameter and the size distribution thereof which can be set in a controlled manner by selection of the comminution process.

The nanoporous polymer particles can be used as such or in admixture with further functional components as thermal insulation materials. A thermal insulation material is accordingly a mixture comprising the nanoporous polymer foams. The choice of suitable functional components as additional components depends on the field of use.

The invention provides vacuum insulation panels comprising the nanoporous polymer foams and also the use of the nanoporous polymer foams for thermal insulation. The materials which can be obtained are preferably used for heat insulation, particularly in buildings, or for cold insulation, especially in the mobile, logistical or stationary field, for example in refrigeration appliances or for mobile applications.

Possible further components of these thermal insulation materials are, for example, compounds which can absorb, scatter and/or reflect heat radiation in the infrared range, in particular in the wavelength range from 3 to 10 μm. They are generally referred to as infrared opacifiers. The particle size of these particles is preferably from 0.5 to 15 microns. Examples of such substances are, in particular, titanium oxides, zirconium oxides, ilmenites, iron titanates, iron oxides, zirconium silicates, silicon carbide, manganese oxides, graphites and carbon black.

To mechanically reinforce the materials, it is possible to use fibers as additives. These fibers can be of inorganic or organic origin. Examples of inorganic fibers are preferably glass wool, rock wool, basalt fibers, slag wool, ceramic fibers comprising melts of aluminum oxide and/or silicon dioxide and also further inorganic metal oxides and pure silicon dioxide fibers, e.g. silica fibers. Organic fibers are preferably, for example, cellulose fibers, textile fibers or polymer fibers.

The following dimensions are employed: diameter: preferably 1-12 microns, in particular 6-9 microns; length: preferably 1-25 mm, in particular 3-10 mm.

Component B)

For technical and economic reasons, inorganic fillers can be added to the mixture. Preference is given to using various, synthetically produced modifications of silicon dioxide, e.g. pyrogenic silica, precipitated silicas, electric arc silicas, $SiO_2$-comprising fly dusts formed by oxidation of volatile silicon monoxide in the electrochemical production of silicon or ferrosilicon, also silicas produced by leaching of silicates such as calcium silicate, magnesium silicate and mixed silicates such as olivine (magnesium iron silicate) with acids. It is also possible to use naturally occurring $SiO_2$-comprising compounds such as diatomaceous earths and kieselguhrs. It is likewise possible to use: thermally expanded minerals such as, preferably, perlites and vermiculites. Depending on requirements, finely divided metal oxides such as, preferably, aluminum oxide, titanium dioxide, iron oxide can preferably be added.

Preference is given to using pyrogenic silica having a specific surface area determined by the BET method of from 90 to 500 $m^2/g$ and an average primary particle size in the range from 5 to 30 nm as component B).

The pyrogenic silica preferably has a water content in the range from 0.1 to 1% by weight, particularly preferably in the range from 0.1 to 0.5% by weight.

Production of the Vacuum Insulation Panels

The invention also provides a process for producing the above-described vacuum insulation panels, in which a mixture of the components A) and optionally B) and further constituents of the core material are introduced into an envelope and the filled envelope is subsequently evacuated and welded. As envelope, preference is given to using a polymer film which has a metallic coating, particularly preferably a metalized polyethylene terephthalate film.

The mixing of the components A) and B) and optionally further components for the core material can generally take place in various mixing apparatuses. However, planetary mixers or tumble mixers are preferably employed. Here, it is advantageous firstly to premix the fibers with part of the second mixing components as a type of masterbatch in order to ensure complete separation of the fibers. After separation of the fibers, the major part of the mixing components is added.

After the mixing process is complete, the bulk density of the mixture can, depending on the type and the amount of the components, preferably be 40-180 $kg/m^3$, preferably 40-120 $kg/m^3$. The resulting porous mixture flows very well, so that it can be pressed homogeneously and without problems to form boards and can also, for example, be introduced into the hollow spaces of hollow building blocks and pressed. In pressing to form boards, the density and consequently also the thermal conductivity of the insulation material can be influenced substantially, via the weight, by setting of particular, board thicknesses.

The use of the nanoporous polymer foams as core insulation material in vacuum insulation panels makes it possible to set an optimal combination of thermal conductivity at low pressure, life and low density as a function of the parameters cell size and foam density and also the particle size and particle size distribution set. As core materials, the nanoporous polymer foams can be used directly as loose material or as pressed moldings.

Vacuum insulation panels (VIPs) generally comprise a core material and a barrier film as gastight envelope. The envelope used has to have very high gastightness. The vacuum insulation panel of the invention is therefore generally enveloped in one or more films composed of plastic or metal, in particular a polymer film provided with one or more vapor-deposited metal layers, as barrier film. Suitable polymer films are, for example, laminated or coextruded films having layers of polyester, polyamide, polyvinyl alcohol and/or polypropylene. Owing to the relatively high gastightness, preference is given to metalized polymer films, in particular aluminum composite films, as barrier film. The barrier film preferably has a thickness in the range from 10 to 500 μm, preferably in the range from 50 to 200 μm. The thickness of the metal layer is preferably in the range from 0.1 to 15 μm, particularly preferably in the range from 5 to 10 μm.

To produce the vacuum insulation panels of the invention, the components A) and B) can be, for example, introduced into a bag made of the barrier film which is open at one side, brought into the desired shape by vibrating or pressing, evacuated and sealed.

The vacuum insulation panels of the invention are particularly suitable for thermal insulation in vehicle construction. It is possible to produce, for example, sheet-like interior trim components which have favorable thermal insulation properties for vehicle construction. It has also been found to be particularly advantageous to use the pulverulent materials according to the invention for this purpose, since the corresponding vehicle components have to satisfy demanding requirements in respect of a complex shape or in respect of a complex structure.

The vacuum panels produced in this way are of great importance where, in particular, only low insulation thicknesses are possible for space reasons; for example in the automobile sector, in the refrigerator sector or in the renovation of buildings.

EXAMPLES

Starting Materials:
PMMA 6N: PMMA Plexiglas 6N from Evonik Röhm GmbH having a glass transition temperature of about 102° C. (measured by DSC in accordance with ISO 11357-2, heating rate: 20 K/min)
Pyrogenic silica: Aerosil 300 from Evonik Degussa GmbH (specific surface area: 300±30 m$^2$/g (BET), and average primary particle size: 7 nm)
Production of a Nanoporous Polymer Foam Based on PMMA A nanoporous polymer foam having a low density was produced by a continuous extrusion process.

A PMMA Plexiglas 6N from Evonik Röhm GmbH was used as delivered as polymeric molding composition here. In step 1, the polymeric molding composition was melted and homogenized in an extruder (Leistritz 18 mm) at a throughput of 2.26 kg/h. Immediately after plasticization of the polymeric molding composition, supercritical $CO_2$ at a pressure of about 475 bar was injected into the molding composition at a melt temperature of about 220° C. For this purpose, a mass flow of about 0.780 kg/h of $CO_2$ was set, giving a loading of about 34.5% by weight based on the mass of the polymer.

The loaded molding composition was then brought by means of mixing and cooling elements to a temperature of about 103° C. before the die. The pressure along the process section after blowing agent injection was maintained at a minimum value of 350 bar by use of melt pumps.

Extrusion of the loaded molding composition under this pressure and at this total mass flow through a round die having a diameter of 0.5 mm and a length of 1.8 mm enabled a depressurization rate according to the invention in the region of 80 000 MPa/s of the polymeric molding composition which had been brought to an appropriate temperature according to the invention to be set.

A continuously extruded optically homogeneous, translucent nanoporous polymer foam having an average foam density of about 200 kg/m$^3$ and an average cell diameter of about 100 nm was obtained in this process. The polymer foam had a bluish appearance in reflected light and appeared slightly reddish in transmitted light.

Milling

The resulting nanoporous polymer foam extrudates based on PMMA were milled to powders by means of a fluidized-bed opposed-jet mill (from Hosokawa Alpine, model AFG 200). Milling was carried out at ambient temperature without embrittlement of the material.

Characterization of the milled PMMA foam was carried out by light beam sieving using the Rhewum LPC 200 LC (V=40 m$^3$/h, n=20 rpm, ionizer 10 kV) sieving machine. The sieving points important for this purpose were set at 63 μm and 100 μm. The sieve analysis was carried out in accordance with DIN 66165. At a rotational speed of 6000 min$^{-1}$, the following particle size distribution was obtained:

| Particle size fraction | Proportion by weight |
|---|---|
| <63 μm | 53% |
| 63 μm-100 μm | 14% |
| >100 μm | 33% |

Mixing

The mixtures of the milled nanoporous polymer foam with the pyrogenic silica were produced by means of the tumble mixer model RRM 200 from J. Engelsmann AG at a mixing time of 6 hours using milling media.

Production of Vacuum Insulation Panels

To produce the vacuum insulation panels, the various nanocellular powders were introduced into a commercial, multiply metalized PET barrier film, subsequently evacuated for 20 minutes and the barrier film was welded shut so as to be gastight. Exactly the same films, the same evacuation machine (from The vac Company®) and the same evacuation conditions were set in all experiments.

The dimensions of the vacuum panels were in each case 20×20×1.5 cm. The measurement of the thermal conductivity was carried out at 10° C. in accordance with DIN 52612.

The water contents were determined by reweighing. The VIPs were opened after the thermal conductivity measurements and the core material was weighed. The core was then dried at 110° C. in a vacuum drying oven for 3 hours and reweighed. The water content in the VIP can be determined to a precision of 0.3% by weight from the mass difference.

The following nanocellular powders were used as filling for the vacuum insulation panels:
P1: pyrogenic silica Aerosil 300, not dried
P2: pyrogenic silica Aerosil 300, dried
P3 milled nanoporous polymer foam extrudates based on PMMA, produced as described above
P4 mixture of 50% by weight of milled nanoporous polymer foam extrudates (P3) based on PMMA, produced as described above, and 50% by weight of undried pyrogenic silica (P1)

TABLE 1

Properties of the vacuum insulation panels

| Example | Filling | Density of the core material [kg/m$^3$] | Water content of the core material [% by weight] | TC [mW/mK] |
|---|---|---|---|---|
| 1 (comparison) | P1 | 180 | 10.0 | 9 |
| 2 | P2 | 160 | 0.5 | 4 |
| 3 | P3 | 180 | 0.1 | 4 |
| 4 | P4 | 180 | 5.0 | 5 |

Due to evaporation of the water from the pyrogenic silica and the resulting increase in pressure in the panel, Comparative Example 1 displays a high thermal conductivity (TC).

Example 4 shows that, up to a proportion by weight of 50% of the milled nanoporous polymer foam extrudates, no drying of the powder mixture of the milled nanoporous polymer foam extrudates and undried pyrogenic silica is necessary.

The invention claimed is:

1. A vacuum insulation panel comprising a barrier film and core material having a density in the range from 50 to 350 kg/m$^3$, wherein the core material comprises a mixture comprising
    A) from 30 to 70 percent by weight of nanoporous polymer particles which have a cell count in the range from 1,000 to 100,000 cells/mm, where at least 60 percent by weight of the nanoporous polymer particles have a particle size of less than 100 μm in the sieve analysis in accordance with DIN 66165, and
    B) from 30 to 70 percent by weight of pyrogenic or precipitated silica.

2. The vacuum insulation panel according to claim 1, wherein at least 50 percent by weight of the nanoporous polymer particles have a particle size of less than 63 μm in the sieve analysis in accordance with DIN 66165.

3. The vacuum insulation panel according to claim 1, wherein the core material has a water content in the range from 0.1 to 5% by weight.

4. The vacuum insulation panel according to claim 1, wherein the nanoporous polymer particles comprise polystyrene, polymethyl methacrylate (PMMA), polycarbonate, styrene-acrylonitrile copolymers, polysulfones, polyether sulfone, polyetherimide, polyurethane, polyurea, melamine-, phenol-, resorcinol-, urea-formaldehyde resins or mixtures thereof.

5. The vacuum insulation panel according to claim 1, wherein the barrier film consists of a metalized polymer film.

6. The vacuum insulation panel according to claim 1, wherein the barrier film has a thickness in the range from 10 to 500 μm.

7. A process for producing a vacuum insulation panel according to claim 1, which comprises introducing a mixture of the components A) and B) into a barrier film and the barrier film is subsequently evacuated and welded shut.

8. The process according to claim 7, wherein pyrogenic silica having a specific surface area determined by the BET method of from 90 to 500 m$^2$/g and an average primary particle size in the range from 5 to 30 nm is used as component B).

9. A thermal insulation that can be utilized in vehicle construction which comprises the vacuum insulation panel according to claim 1.

* * * * *